United States Patent [19]
Boeteng

[11] Patent Number: 5,064,538
[45] Date of Patent: Nov. 12, 1991

[54] MEMBRANE PROCESS FOR ACID RECOVERY

[75] Inventor: Daniel A. D. Boeteng, Montrose, Canada

[73] Assignee: Cominco Ltd., Vancouver, Canada

[21] Appl. No.: 603,053

[22] Filed: Oct. 25, 1990

[51] Int. Cl.$^5$ ............................................. B01D 61/44
[52] U.S. Cl. .................................... 210/638; 210/644; 210/649
[58] Field of Search ............... 210/638, 646, 641, 644, 210/649; 204/151, 153, 130, 182.4, 252, 182.3, 296, 301

[56] References Cited

U.S. PATENT DOCUMENTS 3,947,351 4/1976 Asawa .................................. 210/638

Primary Examiner—Frank Sever
Attorney, Agent, or Firm—Arne I. Fors

[57] ABSTRACT

A method for the recovery of acids from dilute aqueous acid solutions containing at least one metal cation such as Zn, Ca, Mg, Na, K, Mn, Al, Fe, Ni and Co comprises feeding solution to the dialyzate compartments of a dialysis unit. The dialyzate, substantially containing any metal cations, is removed from the process. The diffusate, containing the acid from the feed solution and being substantially free of metal cations, is fed into the dilute stream circulating through the diluate compartments of an electrodialysis unit. A portion of the circulating diluate is returned to the diffusate compartments of the dialysis unit. The concentration gradient of acid anions across the dialysis membranes is increased by adding a quantity of acid-receiving solution to the returned diluate portion. The feed rates of solutions to the compartments of the dialysis unit are at least double those in processes using only dialysis. A concentrate stream is recirculated through the concentrate compartments of the electrodialysis unit. The applied current causes an increase in the acid concentration in the concentrate. A portion of the concentrate is withdrawn as a concentrated acid product substantially free of metal cations. If desired, the acid concentration in the product is controlled by feeding a quantity of the diffusate from the dialysis into the circulating concentrate stream, as necessary. The dialysis is carried out at ambient temperatures up to 45° C., and electrodialysis at from 0° to 60° C. and at 100 to 1000 A/m$^2$.

12 Claims, 1 Drawing Sheet

MEMBRANE PROCESS FOR ACID RECOVERY

This invention relates to the recovery of acid from solutions by a membrane process, and, more particularly, to a process for the recovery and concentration of acids in aqueous solutions by dialysis and electrodialysis.

BACKGROUND OF THE INVENTION

The recovery of acids from aqueous solutions by means of membrane processes is well known. The many membrane processes include dialysis and electrodialysis.

Dialysis is generally carried out in a multi-compartment unit wherein dialyzate compartments are alternating with diffusate compartments separated from each other by suitable membranes. When acidic solutions are treated for the recovery of a diffusate stream containing a major portion of the acid, anionic membranes are used that selectively allow the acid anion as well as protons to pass from the dialyzate side to the diffusate side of the membranes. The dialysis method for treating acidic solutions has the main disadvantage of yielding an acid product of a relatively low concentration because the driving force is mainly determined by the acid concentration gradient across the membranes. To obtain an efficient production rate and a high acid concentration in the product stream, large equipment with a high membrane area is required.

Electrodialysis is generally carried out in a unit that comprises a multiplicity of alternating anionic and cationic permselective membranes defining alternating diluate and concentrate compartments between an anode compartment containing an anode and a cathode compartment containing a cathode. The electrodes are connected to a source of direct electrical current. Electrodialysis is more effective than dialysis for concentrating dilute acid solutions, but has the disadvantage that, when the acid solutions contain cations, the concentrated acid solution often also contains undesirable concentrations of those cations. Another disadvantage of electrodialysis is low current efficiency due to proton leakage through the anion exchange membranes. In order to improve the efficiency of acid transfer, it is necessary to select membranes carefully, as well as to operate at moderately high current densities. Such high current densities, however, result in a decreased selectivity of the acid removal.

The prior art contains many references on the use of either dialysis or electrodialysis for the separation or concentration of acids in solutions. In Jap. Kokai 53-19171 (1978) there is described a method for separating and recovering both acids and metals from acid and metal-containing solutions. Solution is fed to a dialysis tank for the removal of acid, and resulting solution is then subjected to membrane electrolysis for the electrodeposition of metals. The metal-reduced solution is subjected to electrodialysis from which the concentrate, i.e. solution concentrated in acids and metals, is fed to the membrane electrolysis tank and the dilute solution is returned to the dialysis step. This appears to be one of the few processes in which both dialysis and electrodialysis are used.

SUMMARY OF THE INVENTION

I have now found that the disadvantages of dialysis and electrodialysis may be substantially obviated by using a process for the recovery and concentration of acids from aqueous acidic solutions which comprises dialysis integrated with electrodialysis. The efficiency of the process of the invention is much higher than obtained with either dialysis or electrodialysis alone or when dialysis and electrodialysis would be operated in series.

The process of the invention comprises feeding an aqueous acid solution, that may contain at least one other substance such as a metal ion in addition to hydrogen ions (protons), to the dialyzate compartments of a dialysis unit. The dialyzate, which substantially contains any cations other than protons from the feed solution, is removed from the process. The diffusate contains the major portion of the acid from the feed solution and may contain low concentrations of other substances. The diffusate is fed into the diluate stream circulating through the diluate compartments of an electrodialysis unit. A portion of the circulating diluate is diverted to the diffusate compartments of the dialysis unit. To increase the concentration gradient of the acid anion across the membranes in the dialysis unit, a quantity of an acid-receiving solution may be added to the diluate portion that is fed to the diffusate compartments.

A concentrate stream is circulated through the concentrate compartments of the electrodialysis unit. By virtue of the direct current applied between the electrodes, the concentration of acid in the concentrate increases. A portion of the circulating concentrate is withdrawn as the concentrated acid product substantially free of any other substance. To control the acid concentration of the product at a desired level, a portion of the diffusate from the dialysis may be fed into the circulating concentrate stream, as necessary.

The process according to the present invention is fundamentally different from that described in the Jap. Kokai (supra). Not only does the present method not use membrane electrolysis to deposit metals, but only the diffusate, not both the dialyzate and the diffusate from the dialysis, is further treated. Moreover, no means are provided in the method described in the Jap. Kokai for controlling the acid concentration at a desired level. These and other differences will become apparent from the detailed description of the invention.

Accordingly, there is provided a method for the recovery of acids from aqueous acid solutions containing at least one other dissolved substance comprising the steps of feeding aqueous acid feed solution to a dialysis unit, said unit comprising dialyzate compartments alternating with diffusate compartments separated by acid anion permeable membranes, said dissolved substance being a substance that will not substantially transfer into the diffusate compartments, and said feed solution being fed into said dialyzate compartments forming a dialyzate; transferring acid anions from said feed solution through said membranes into said diffusate compartments to form a diffusate while substantially preventing transfer of said dissolved substance; withdrawing dialyzate reduced in acid anions and substantially containing said dissolved substance from said dialyzate compartments; withdrawing diffusate from said diffusate compartments; passing withdrawn diffusate to an electrodialysis unit comprising a multiplicity of alternating anion and cation permselective membranes defining alternating diluate compartments and concentrate compartments arranged between an anode in an anode compartment and a cathode in a cathode compartment, at least a portion of said withdrawn diffusate being passed to said diluate compartments; applying a direct electrical current between said anode and said cathode; recirculating a diluate stream through said diluate compartments; passing a portion of said recirculating diluate stream to the diffusate compartments of said dialysis unit; recirculating a concentrate stream through said concentrate compartments, said current causing said acid anions to pass from said diluate stream into said concentrate stream; and withdrawing a portion of said recirculating concentrate stream as concentrated acid product.

It is an aspect Of the present invention to provide an efficient membrane process for recovering and concentrating acid from aqueous acidic solutions containing at least one other substance in addition to the acid.

It is another aspect to provide a process for the concentration of acids by dialysis integrated with electrodialysis to yield an acid product substantially free from dissolved substances present in the feed.

BRIEF DESCRIPTION OF DRAWING

These and other aspects will become apparent from the following detailed description with reference to the accompanying drawing in which.

DETAILED DESCRIPTION

Figure 1:
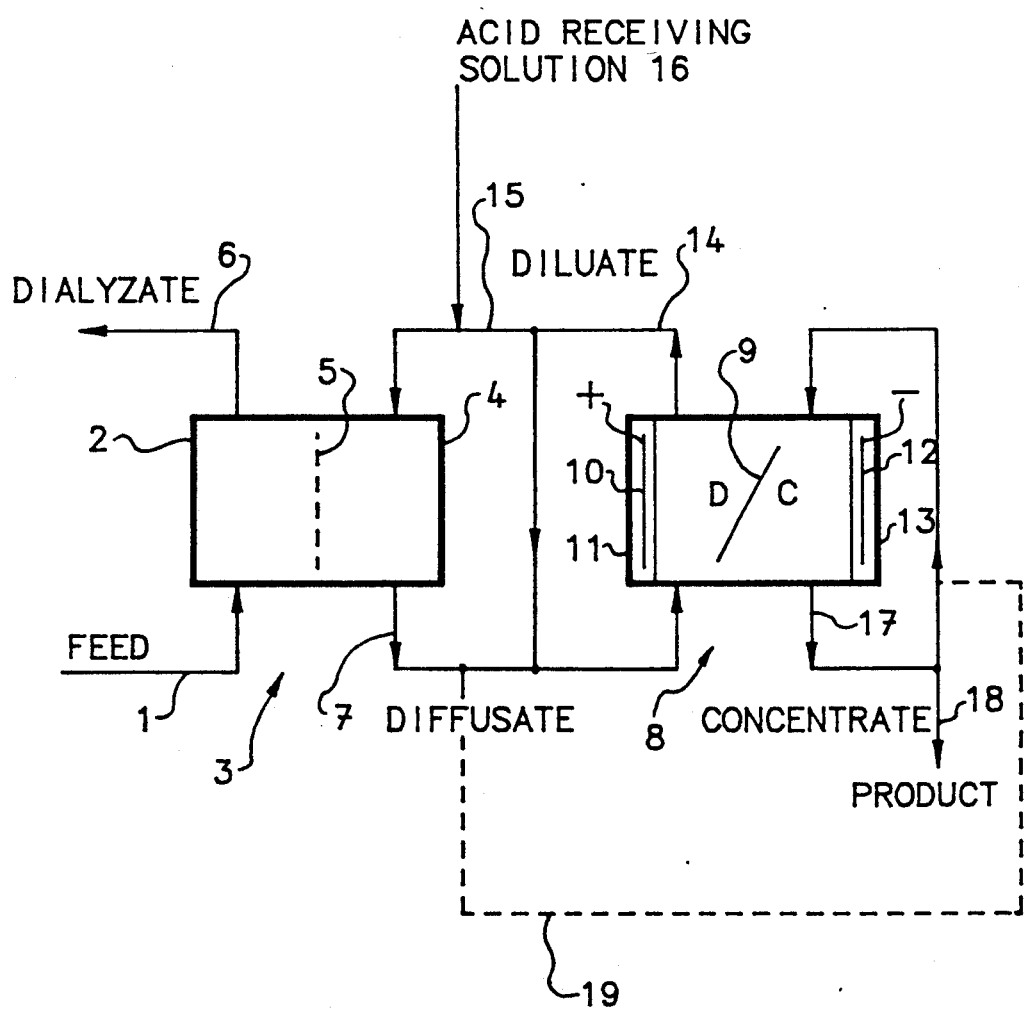
FIG. 1 is a schematic flow diagram of the process according to the invention.

The acid solutions that can be treated include aqueous acidic solutions that comprise at least one acid chosen from the group consisting of sulfuric acid, hydrochloric acid and nitric acid, and at least one other dissolved substance. The acid solutions may contain as little as about 10 g/L acid but, practically, should contain at least about 30 g/L acid. When nitric acid solutions are treated, care must be taken that the acid concentrations does not reach high values that may affect the membrane life through oxidation. The at least one other dissolved substance usually comprises cations in the acidic solution that are associated with the acid anion, usually dependent on the source of the acidic solution, but may also comprise others present as non-anionic species such as, for example, arsenical or antimonial species. The cations may include cations of at least one metal chosen from the group consisting of Zn, Cd, Ca, Mg, Na, K, Mn, Al, Fe, Cu, Ni and Co. It is understood that other ions may be present. Essentially the at least one other dissolved substance includes those substances that will not substantially transfer into the diffusate in the dialysis, as will be described.

With reference now to FIG. 1, aqueous acidic feed solution 1 containing at least one acid of the above-mentioned group, and which may contain amounts of cations or other dissolved non-anionic substances, that will not substantially transfer, is fed into the dialyzate compartments 2 of a dialysis unit schematically and generally indicated with 3. Dialysis unit 3 comprises alternating dialyzate compartments 2 and diffusate compartments 4 which are separated from each other by suitable anionic membranes 5. For the sake of simplicity, only one each of the dialyzate and diffusate compartments and the membranes is shown. During dialysis, the acid will be removed from the feed solution into a diffusate, while the other substance(s) substantially remain in a dialyzate. Suitable membranes are for example Selemion TM DMV and DSV membranes, but other membranes giving similar results may be used. Anionic membranes 5 are permeable for the acid anions, which transfer through membranes 5 under the driving force created by the concentration gradient of the anions across the membranes. Membranes 5 are substantially impermeable to the at least one other substance. Protons, however, easily transfer, due to their small size and high mobility, thereby satisfying the requirement for electron neutrality.

The at least one dissolved substance that might be present in the diffusate is present in concentrations that will not cause fouling of membranes.

Dialyzate 6 is removed from the dialyzate compartments 2 at a rate substantially equal to the rate of addition of feed 1, which is in the range of about 1 to 5.0 L/h.m$^2$. These feed rates are about twice the commonly used rates for a process using dialysis only. A solution, to be described, is fed to the diffusate compartments 4. Diffusate 7 is discharged from the diffusate compartments 4, and is passed to the diluate compartments of an electrodialysis unit, which is schematically indicated with 8. The dialysis is carried out at ambient temperatures up to about 45° C.

Electrodialysis unit 8 comprises a multiplicity of alternating suitable anion and cation permselective membranes, schematically indicated with 9. The alternating membranes define alternating diluate and concentrate compartments, schematically indicated with D and C, respectively, arranged between an anode 10 in an anode compartment 11 and a cathode 12 in a cathode compartment 13.

Suitable cation permselective membranes are, for example, strongly acidic membranes which have a membrane matrix of a styrene di-vinyl benzene copolymer on a polyvinyl chloride base and possess sulphonic acid radicals (R—SO$_3$H) as active groups. The active groups comprise 3-5 milli-equivalents per gram of dry resin. Selemion TM -type membranes, such as Selemion TM CMR, CMV-A, CSV and CSR, specially treated to be monovalent permselective, are particularly suitable.

Suitable anion permselective membranes are, for example, basic membranes with tertiary amine or quaternary ammonium active groups, such as, for example, derived from trimethylamine (for example, R—N(CH$_2$)$_3$.Cl), at 3-5 milli-equivalents per gram of dry resin, and having a matrix of a styrene di-vinyl benzene copolymer on a polyvinyl chloride base. Selemion TM ASV, and ASR membranes and particularly Selemion TM AAV membranes are suitable. It is understood that other membranes with similar properties are similarly suitable, and that the use of combinations of other membranes may yield the desired results.

The anode 10 and the cathode 12 are made of suitable materials, i.e., those that are compatible with the generation of oxygen at the anode and the evolution of hydrogen at the cathode. For example, anode 10 can be made of platinum or platinum-coated titanium and cathode 12 of platinum-coated titanium or stainless steel. A direct electrical current is applied to the electrodes from a source of electrical current (not shown).

In the electrodialysis, the acid solution from the dialysis step will be concentrated in a concentrate stream and the diluate stream from the diluate compartments will substantially contain the other substance(s) present in the diffusate.

The diffusate 7 from diffusate compartments 4 is fed to the diluate compartments D, and a diluate stream 14 is withdrawn from the diluate compartments. Withdrawn diluate 14 is recirculated through the diluate compartments D, and a portion 15 of the circulating diluate stream is passed to the diffusate compartments 4 of dialysis unit 3. An important feature of the present invention is that an amount of acid-receiving solution 16, such as a dilute acid, a salt solution, the salt being of the acid being treated, or water may be added to the diluate portion 15 fed into diffusate compartments 4. Solution 16 is fed to diffusate compartments 4 at a high rate in the range of about 2 to 10 L/h.m$^2$ of membrane surface area. The addition of acid-receiving solution 16 decreases the anion (acid) concentration in the diffusate compartments 4, and thereby increases the concentration gradient across anionic membranes 5 in the dialysis. The increased concentration gradient enhances the efficiency of the dialysis and thereby allows the use of a smaller dialysis unit. The amount of acid-receiving solution added to the diluate should be sufficient to increase the concentration gradient in the dialysis.

A concentrate stream 17, i.e. a solution concentrated in acid, is withdrawn from the concentrate compartments C, preferably at a rate equal to the rate of the net water transfer from the diluate to the concentrate during the electrodialysis. Concentrate stream 17 is recirculated through the concentrate compartments C, and a portion of the circulating concentrate is withdrawn as product 18. If desired, the acid concentration in the product 18 is controlled, i.e. lowered, by feeding water (not shown) or feeding a portion 19 of the diffusate 7 from dialysis 3 into the recirculating concentrate stream 17, as indicated with the broken line. It is important to maintain turbulent conditions in the concentrate and diluate compartments. This can be done by passing solution through the compartments at a sufficient rate, such as achieved by the recycling of the diluate and the concentrate streams to the respective compartments.

In the anode and cathode compartments 11 and 13, the predominant reactions are oxygen and hydrogen evolution, respectively. The anode and the cathode in their respective compartments are rinsed with circulating rinse solutions (not shown). If less control of conditions is permissible, a common rinse solution may be circulated to both the electrode compartments. The rinse solutions may be chosen from water, dilute acid and acidified sodium sulfate solution maintained at a pH in the range of about 0 to 4. Suitable acidic rinse solutions may contain sulfate in a concentration in the range of about 0.05 to 0.5 molar, or sulfuric acid in a concentration in the range of from 0.01 to 1 molar. The rinse solutions are circulated through the electrode compartments at rates sufficient to give a differential pressure across the membranes of less than about 150 kPa, preferably less than about 50 kPa. A portion of the rinse solutions may be removed from circulation and be replaced with a substantially equal portion of fresh solution. The flow rates of the rinse solutions are generally in the range of about 25 to 90 L/h.m$^2$, and are preferably in the range of about 40 to 80 L/h.m$^2$.

During electrodialysis, the acid anions (and protons) in the feed to the diluate compartments D pass from the diluate compartments D to the concentrate compartments C through the anionic and cationic permselective membranes respectively. The gases evolved at the electrodes are carried from the cathode and anode compartments in the rinse solutions.

The electrodialysis unit may be operated with solution temperatures in the range of from just above the freezing temperature of the solution to as high as about 60° C., i.e. from about 0° C. to 60° C. At the higher temperatures, the process is more efficient but the life of the membranes may be reduced. The process is preferably operated with solution temperatures in the range of from ambient temperatures to about 50° C.

Feed rates to the electrodialysis unit may be selected in the range of about 2 to 40 L/h.m$^2$ per membrane pair, the selected value being dependent on the concentration of dissolved substance in the feed solution and the value of the current density. The flow rate of solutions through the concentrate and diluate compartments should provide turbulent flow and the flows through the compartments should be substantially balanced in order to maintain a differential pressure across the membranes not exceeding about 150 kPa, preferably less than 50 kPa.

The current applied to the electrodes is controlled to maximize the current efficiency. The current is equivalent to a current density (applied current per effective membrane surface area) in the range of about 100 to 1000 A/m$^2$, the particular value selected being chosen with respect to the desired acid concentration in the diluate. Below about 100 A/m$^2$, the ionic transfer rate is low and above about 1000 A/m$^2$ heat generation may be excessive. Preferably, the current density is chosen in the range of about 500 to 1000 A/m$^2$.

The invention will now be illustrated by the following non-limitative examples.

EXAMPLE 1

This example illustrates the use of dialysis by itself. A dialysis unit was assembled consisting of 19 sheets of Selemion DMV anionic membranes with a total effective membrane area of 3970 cm$^2$. A feed solution containing hydrochloric acid and aluminum was fed into the dialyzate compartments to separate the acid into a diffusate. Water was fed into the diffusate compartments as acid-receiving solution. The test conditions and results are given in Table I.

TABLE I

|  | Flow Rate L/h · m$^2$ | g/L HCl | g/L Al |
|---|---|---|---|
| Feed solution | 0.83 | 105 | 14.8 |
| Water | 0.83 | — | — |
| Diffusate | 0.71 | 88 | 0.37 |
| Dialyzate | 0.95 | 26 | 12.7 |

The results show that a major portion of the acid is separated in the diffusate, while the aluminum is substantially retained in the dialyzate.

EXAMPLE 2

Using the same unit as in Example 1, an acidic sulfate solution derived from a hydrometallurgical production process of zinc was similarly treated. The test conditions and results are given in Table II.

TABLE II

|  | Flow Rate L/h · m$^2$ | g/L H$_2$SO$_4$ | g/L Zn | g/L Mg | g/L Mn |
|---|---|---|---|---|---|
| Feed Solution | 0.77 | 234 | 20 | 7.9 | 1.1 |
| Water | 0.79 | — | — | — | — |
| Diffusate | 0.80 | 182 | 0.4 | 0.13 | 0.03 |
| Dialyzate | 0.76 | 45 | 19.8 | 7.9 | 1.1 |

The results show that the diffusate contains a major portion of the acid in the feed and is substantially free of other substances, which are substantially retained in the dialyzate.

EXAMPLE 3

The membranes in the test unit of Example 1 were replaced with Selemion DSV membranes and the test of Example 2 was repeated with the same feed solution. The test data and results are given in Table III.

TABLE III

| | Flow Rate L/h·m² | g/L $H_2SO_4$ | g/L Zn | g/L Mg | g/L Mn |
|---|---|---|---|---|---|
| Feed Solution | 0.91 | 234 | 20 | 7.9 | 1.1 |
| Water | 0.83 | — | — | — | — |
| Diffusate | 0.76 | 214 | 1.6 | 0.54 | 0.1 |
| Dialyzate | 0.98 | 51 | 17 | 7.0 | 0.93 |

EXAMPLE 4

Using the unit of Example 3 another acidic zinc solution was similarly treated with the results as shown in Table IV.

TABLE IV

| | Flow Rate L/h·m² | g/L $H_2SO_4$ | g/L Zn | g/L Mg | g/L Mn |
|---|---|---|---|---|---|
| Feed Solution | 0.95 | 150 | 50 | 8 | 1.5 |
| Water | 1.0 | — | — | — | — |
| Diffusate | 0.95 | 120 | 2.0 | 0.31 | 0.06 |
| Dialyzate | 1.0 | 29 | 45.7 | 7.3 | 1.4 |

The results presented in Tables I, II, III and IV show that acid can be selectively removed from a metal-containing acid solution. However, the acid concentration in the diffusate acid product was lower than that in the feed solution. Moreover, at temperatures of 20° C.–25° C., feed and water rates of 0.7 to 1 L/h.m² had to be selected in order to maximize both the acid recovery and the concentration in the acid product.

EXAMPLE 5

This example illustrates the use of electrodialysis by itself to remove acid from a metal-containing solution. An electrodialysis unit was assembled consisting of 10 membrane pairs with a total effective membrane area of 1720 cm² for the 10 pairs. Selemion CMV-A specially surface-treated cationic membranes, and Selemion AAV anionic membranes were used. An acidic solution containing Zn, Mg and Mn was treated at a feed rate of 43.4 L/h.m².

The feed solution was circulated through the diluate compartments at a linear velocity of 5 cm/sec. Water was fed into the concentrate at 2.87 L/h.m², the concentrate being circulated through the concentrate compartments at a linear of velocity of 5 cm/sec. A 20 g/L $H_2SO_4$ solution was circulated through the electrode compartments as rinse solution. The test was allowed to proceed for 24 hours. Other test parameters and results are given in Table V.

TABLE V

Current Density: 1,000 A/m²
Temperature: 40° C.

| | Composition g/L | | | |
|---|---|---|---|---|
| Solution | $H_2SO_4$ | Zn | Mg | Mn |
| Feed Solution | 100 | 5.1 | 6.6 | 1.5 |
| Diluate | 86 | 5.1 | 6.5 | 1.5 |
| Concentrate | 221 | 3.6 | 4.7 | 0.3 |

The results show that, while the degree of acid removal was low, the acid concentration in the acid product (concentrate) was much higher than that in the feed solution. It can also be seen that the selectivity was low, with significant metal losses to the acid product.

Thus, the use of electrodialysis alone to recover acid will require more than one stage in order to maximize the recovery, but significant metal concentrations would be present in the acid product.

EXAMPLE 6

This example illustrates the use of an integrated process using dialysis and electrodialysis according to FIG. 1 to give a much more effective acid removal and recovery than by using either a dialysis process or an electrodialysis process by itself.

A feed solution containing 145 g/L $H_2SO_4$, 53 g/L Zn, 7.5 g/L Mg and 1.5 g/L Mn was fed at a rate of 1.7 L/h.m² to the dialyzate compartments of the dialysis unit as used in Example 1. Water was added to a portion taken from the recirculating diluate stream from the electrodialysis unit giving a solution containing 7.5 g/L $H_2SO_4$, 1.2 g/L Zn, 0.2 g/L Mg and 0.03 g/L Mn. The resulting solution was fed at a rate of 4.8 L/h.m² to the diffusate compartments of the dialysis unit. The unit was operated at 24° C. Acid was removed from the feed solution giving a dialyzate containing 38 g/L $H_2SO_4$, 41.2 g/L Zn, 5.8 g/L Mg, and 1.2 g/L Mn. The dialyzate was withdrawn at a rate of 2.2 L/h.m². A diffusate stream was produced at a rate of 4.3 L/h.m², and was found to contain 46 g/L $H_2SO_4$, 1.2 g/L Zn, 0.16 g/L Mg and 0.03 g/L Mn.

The diffusate was fed to the diluate compartments of the electrodialysis unit, as used in Example 5, at a rate of 6.7 L/h.m². The electrodialysis was operated at a current density of 500 A/m². The temperature was maintained at 45° C. The diluate was withdrawn from circulation at a rate of 5.6 L/h.m², and was found to contain 11 g/L $H_2SO_4$, 1.3 g/L Zn, 0.2 g/L Mg, and 0.04 g/L Mn. An acid product (concentrate) from the electrodialysis was withdrawn from recirculating concentrate at the rate of 1.1 L/h.m². The acid product contained 220 g/L $H_2SO_4$, 0.7 g/L Zn, 0.1 g/L Mg and 0.02 g/L Mn.

In a second test, a diffusate from the dialysis unit containing 40.1 g/L $H_2SO_4$ was fed at a rate of 11.6 L/h.m² to the electrodialysis unit operated at 750 A/m². Diluate, was withdrawn from circulation at a rate of 10 L/h.m² and was found to contain 9.9 g/L $H_2SO_4$. Concentrate (acid product) containing 250 g/L $H_2SO_4$ was withdrawn from circulation at a rate of 1.5 L/h.m².

Thus, the use of a combination of dialysis and electrodialysis yielded an acid product which was high in acid and low in dissolved metal content. Moreover, the dialysis could be fed with the feed solution at a high rate.

EXAMPLE 7

This example illustrates how a combined dialysis-electrodialysis process can be used to treat a solution containing hydrochloric acid and aluminum for the effective and selective recovery of acid substantially free of aluminum.

A feed solution containing 105 g/L HCl and 14.8 g/L Al was fed at a rate of 1.6 L/h.m² to the dialysis unit as used in Example 1. Water was added to a diluate from an electrodialysis forming a solution containing 1.9 g/L HCl and 0.3 g/L Al, which was fed to the diffusate compartments of the dialysis unit at a rate of 4.7 L/h.m². The dialysis was carried out at 26° C. A dialyzate was produced at a rate of 2.3 L/h.m², and was found to contain 24 g/L HCl and 9.7 g/L Al. A diffusate stream containing 28 g/L HCl and 0.4 g/L Al was produced at the rate of 4 L/h.m². Diffusate was fed to the electrodialysis unit, as used in Example 5, at a rate of 6.5 L/h.m². The electrodialysis unit was operated at 500 A/m². The temperature was controlled at 50° C. in the circulating diluate and concentrate streams.

Diluate was withdrawn from circulation at a rate of 5.0 L/h.m², and was found to contain 2.6 g/L HCl and 0.44 g/L Al. A concentrate (acid product) containing 118 g/L HCl and 0.25 g/L Al was withdrawn from circulation at a rate of 1.5 L/h.m².

It is understood that changes and modifications may be made in the invention without departing from the scope and purview of the appended claims.

I claim:

1. A method for the recovery of acids from aqueous acid solutions containing at least one other dissolved substance comprising the steps of feeding aqueous acid feed solution to a dialysis unit, said unit comprising dialyzate compartments alternating with diffusate compartments separated by acid anion permeable membranes, said dissovled substance being a substance that will not substantially transfer into the diffusate compartments, and said feed solution being fed into said dialyzate compartments forming a dialyzate; transferring acid anions from said feed solution through said membranes into said diffusate compartments to form a diffusate while substantially preventing transfer of said dissolved substance from said dialyzate compartments; withdrawing dialyzate reduced in acid anions and substantially containing said dissolved substance; withdrawing diffusate from said diffusate compartments; passing withdrawn diffusate to an electrodialysis unit comprising a multiplicity of alternating anion and cation permselective membranes defining alternating diluate compartments and concentrate compartments arranged between an anode in an anode compartment and a cathode in a cathode compartment, at least a portion of said withdrawn diffusate being passed to said diluate compartments; applying a direct electrical current between said anode and said cathode; recirculating a diluate stream through said diluate compartments; passing a portion of said recirculating diluate stream to the diffusate compartments of said dialysis unit; recirculating a concentrate stream through said concentrate compartments, said current causing said acid anions to pass from said diluate stream into said concentrate stream; and withdrawing a portion of said recirculating concentrate stream as concentrated acid product.

2. A method as claimed in claim 1, wherein said dilute aqueous acid solution comprises at least one acid chosen from the group consisting of sulfuric acid, hydrochloric acid and nitric acid in a concentration of at least 10 g/L.

3. A method as claimed in claim 2, wherein said solution contains said acid in a concentration of at least 30 g/L.

4. A method as claimed in claim 1, wherein said dissolved substance comprises cations of at least one metal chosen from the group consisting of Zn, Cd, Ca, Mg, Na, K, Mn, Al, Fe, Cu, Ni and Co.

5. A method as claimed in claim 4, wherein said dissolved substance is present in a concentration that will not cause fouling of mèmbranes.

6. A method as claimed in claim 1, wherein said dissolved substance is present in a concentration that will not cause fouling of membranes.

7. A method as claimed in claim 1, wherein an amount of an acid-receiving solution is added to the portion of said recirculating diluate stream being passed to the diffusate compartments of said dialysis unit.

8. A method as claimed in claim 7, wherein said amount of acid-receiving solution is sufficient to increase the concentration gradient across said anionic membranes in said dialysis unit.

9. A method as claimed in claim 7, wherein said amount of acid-receiving solution is passed to said diffusate compartments at a rate in the range of about 2 to 10 L/h.m² of membrane surface area in said dialysis unit.

10. A method as claimed in claim 1, wherein a portion of said withdrawn diffusate is fed into said recirculating concentrate stream.

11. A method as claimed in claim 1, wherein said current is equivalent to a current density in the range of about 100 to 1000 A/m².

12. A method as claimed in claim 1, wherein said current is equivalent to a current density in the range of about 500 to 1000 A/m².

* * * * *